(12) United States Patent
Gotfried (10) Patent No.: US 7,342,165 B2
(45) Date of Patent: Mar. 11, 2008

(54) SYSTEM, DEVICE AND METHOD FOR DISPLAYING A CONDUCTOR AND MUSIC COMPOSITION

(76) Inventor: Bradley L. Gotfried, 30-31 Sai kung Tai Street, Sai Kung, New Territories (HK)

(*) Notice: Subject to any disclaimer, the term of this patent is extended or adjusted under 35 U.S.C. 154(b) by 55 days.

(21) Appl. No.: 11/219,608

(22) Filed: Sep. 2, 2005

(65) Prior Publication Data

US 2007/0051227 A1  Mar. 8, 2007

(51) Int. Cl.
*A63H 5/00* (2006.01)
*G04B 13/00* (2006.01)
*G10H 7/00* (2006.01)
*G09B 15/00* (2006.01)
*G09B 15/02* (2006.01)

(52) U.S. Cl. ...................................... 84/609; 84/470 R
(58) Field of Classification Search ............. 84/609, 84/470 R, 471 R, 477 R, 478, 483.1
See application file for complete search history.

(56) References Cited

U.S. PATENT DOCUMENTS

| | | | |
|---|---|---|---|
| 4,779,510 A | 10/1988 | Van Den Abbeel | |
| 4,976,182 A | 12/1990 | Obuchi et al. | |
| 5,005,459 A * | 4/1991 | Adachi et al. | 84/453 |
| 5,400,687 A | 3/1995 | Ishii | |
| 5,467,102 A | 11/1995 | Kuno et al. | |
| 5,728,960 A | 3/1998 | Sitrick | |
| 5,760,323 A | 6/1998 | Romero et al. | |
| 5,890,116 A * | 3/1999 | Itoh et al. | 704/260 |
| 6,084,168 A | 7/2000 | Sitrick | |
| 6,348,648 B1 | 2/2002 | Connick, Jr. | |
| 6,380,471 B2 | 4/2002 | Matsumoto | |
| 6,380,474 B2 | 4/2002 | Tarugucki et al. | |
| 6,388,181 B2 * | 5/2002 | Moe | 84/477 R |
| 6,392,132 B2 | 5/2002 | Uehara | |
| 6,414,231 B1 | 7/2002 | Miyamoto et al. | |
| 6,421,496 B1 | 7/2002 | Sato | |
| 6,809,246 B2 * | 10/2004 | Errico | 84/477 R |
| 2001/0037719 A1 | 11/2001 | Gardner et al. | |
| 2002/0066357 A1 | 6/2002 | Kosakaya et al. | |
| 2003/0110926 A1 * | 6/2003 | Sitrick et al. | 84/477 R |
| 2005/0060751 A1 * | 3/2005 | Glaser | 725/87 |
| 2005/0081701 A1 * | 4/2005 | Shao | 84/612 |

FOREIGN PATENT DOCUMENTS

| | | |
|---|---|---|
| EP | 0 475 758 A2 | 3/1992 |
| FR | 2762130 | 10/1998 |
| JP | 2004-102205 | 4/2004 |
| WO | WO 01/56013 | 8/2001 |

* cited by examiner

*Primary Examiner*—Jeffrey Donels
(74) *Attorney, Agent, or Firm*—Akerman Senterfitt (57) ABSTRACT

The invention provides a musical display system for displaying musical notes to a musician and may include a camera for capturing a conductor image. The system may also include a display structure configured to display a conductor image and a musical note. A processor may be coupled to the camera and the display structure where the processor can signal the camera to capture a conductor image. The control center may signal the display structure to display a conductor image and a musical note. In another arrangement, a musical display system for displaying musical notes to a musician may include a display structure configured to display a conductor image and a musical note. The system may include a processor coupled to the display structure where the processor may include a animated conductor generator. The processor may signal the display structure to display a conductor image and a musical note.

20 Claims, 5 Drawing Sheets

SYSTEM, DEVICE AND METHOD FOR DISPLAYING A CONDUCTOR AND MUSIC COMPOSITION

FIELD OF THE INVENTION

The present invention relates generally to the field of music. More particularly, the present invention relates to systems for displaying a conductor and a musical composition to a musician.

BACKGROUND OF THE INVENTION

When one enjoys the performance of an orchestra, there nevertheless is the recognition that very little has changed for many years with respect to the relationship between musicians and their conductor. Traditionally, musicians have played music from printed copies of sheet music. By having a printed copy of a music sheet during a performance, musicians can play an instrument and perform the musical composition without having to memorize the notes to the music. The capability to a play a variety of musical compositions without the need to memorize the musical compositions is of great advantage to a musician.

Nevertheless, printed musical sheets do have inherent flaws. The storage and cataloging of the sheet music also presents challenges, as it becomes bulky in volume and the paper typically does not age well. Musical sheets can be lost, a page can be ripped or missing, and pages must be turned during a performance. By having to turn a page of a music sheet during a musical performance, the musician cannot fully concentrate on their musical performance.

Printed music sheets provide a wealth of information to the musician; however, during a performance, a musician needs to focus their attention towards a specific portion of the music sheet during a performance. The specific portion changes throughout the progression of the musical composition corresponding to the progress of the musical performance. Therefore, not only does the musician need to focus their attention on reading the musical composition, the musician must not lose the dynamic position of the musical composition on the music sheet.

In addition to reading a musical score from printed sheet music during a musical performance involving a conductor, some musicians may need to watch the conductor's movements, instructions, and body language to properly play a song and perform as a group. For some musicians, concentrating on the conductor and the sheet music, which can include turning pages of the sheet music, can prove to be a daunting task. Because a musician must focus their attention and eyesight towards two different subjects, a musician's performance may suffer.

In recent years, there have been a number of patents issuing on various types of electronic music displays. U.S. Pat. No. 4,779,510 describes an electronic apparatus for displaying music. The system disclosed is adapted to monitor the performance of a piece of music and by recognizing predetermined reference signatures, to produce a page change command as necessary. Thus, performers are able to tell what portion of the musical composition is being performed.

U.S. Pat. No. 5,760,323 is directed to networked electronic music display stands, and provides for the display of a musical score, which may be controlled by remote mechanical activation or by the sound of musical notes. A further source of control could be a timed system. It is envisioned that a plurality of these display stands will be networked to simultaneously display musical notes to a number of musicians.

U.S. Pat. No. 6,084,168 is directed to a musical composition communication system, architecture, and methodology. A system controller is used by a conductor to select a musical composition and to transmit all or portions of the information to a music stand to be used by a performer. The system provides that the conductor may be able to edit and make changes in a musical score to be transmitted to individual stands as necessary. The system provides flexibility to allow for the user to make and transmit changes, as well as to direct and conduct a musical performance to be followed by the performers at individual stands.

U.S. Pat. No. 6,348,648 B1 is directed to a system and method for coordinating music display among players in an orchestra. The conductor is able to edit one or more score parts of a composition using various techniques, and these edits are transmitted to the performers at individual stands.

U.S. Patent No. 2002/0066357 A1 is directed to an electronic music apparatus. The system includes a music control unit and provides for both music storage and music data distribution. Information is transmitted to music display sites in order for individual performers to access the music data for either rehearsal or performance purposes.

U.S. Pat. No. 6,421,496 B1 is directed to circuitry that enables the superimposition of signals to enable images from dual sources to appear together through the control of their independent signals through phasing techniques. There is no recognition in the disclosure that such superimposition will have utility with bands and orchestras.

None of the cited references address some of the problems which have plagued orchestras and bands for years. Tentatively watching a conductor's movements while reading sheet music has challenged the most skilled musicians. Such problems are only exacerbated when a musician is mobile, such as the musicians in a marching band.

Further, up to this point in time, there has not been the ability to produce first rate music with various musicians located remotely from one another. With modern day amplification techniques, improved performances may be achievable, even with musicians remote to one another if there is proper leadership to create the necessary unity in performance.

Thus, up to this point in time it has been necessary to have a full contingent of musicians present for practices to enable the band or orchestra to benefit from the conductor's presence and leadership. This makes it difficult for performers, taking into consideration geographical issues and personal issues such as illnesses and other jobs. Difficulties in scheduling practices are prevalent with student orchestras and bands.

SUMMARY OF THE INVENTION

The invention provides devices, systems, and methods for enhancing musical performances by allowing the musicians to concentrate more fully on creating music instead of the mechanics of playing music. The devices, systems, and methods allow the musician to follow a musical score without any physical interaction with clumsy notes, papers, or musical score sheets.

In one aspect of the invention, a musical display system for displaying musical notes to a musician is provided. The system may include a camera for capturing a conductor image, a display structure configured to display a conductor image and a musical note, and a processor coupled to the camera and the display structure. The processor may signal the camera to capture a conductor image the processor may signal the display structure to display a conductor image and a musical note. The camera may include a video camera for capturing video of the conductor images.

In one embodiment, the conductor image may be superimposed with the a musical note. Also, the display structure may display an advancing musical score. The processor may be configured to receive electronic documents where the electronic documents contain images of the musical note. Additionally, the display structure may include a user interface for providing the user the ability to navigate through a plurality of music compositions and select a musical composition. Also, the a musical note signals to a user to play the a musical note.

In another aspect of the invention a musical display system for displaying musical notes to a musician is provided. The system may include a display structure configured to display a conductor image and a musical note and a processor coupled to the display structure where the processor can include an animated conductor generator. The processor may signal the display structure to display a conductor image and a musical note. Also, the processor may be configured to receive electronic documents where the electronic documents contain images of the musical note. The virtual conductor may be displayed on the display structure as the conductor image.

In one arrangement, the animated conductor images may be superimposed with the a musical note. Also, the movements of the animated conductor images may provide instruction to the user regarding which notes to play. Also, the display structure may display an advancing musical score. The display structure can also include a user interface for providing the user the ability to navigate through a plurality of music compositions and select a musical composition. Additionally, the musical note may signal to a user to play the a musical note.

In another aspect of the invention, a method of providing musical instruction is disclosed. The method may include the steps of displaying a musical note and displaying a conductor image. The musical note and the conductor image may be displayed simultaneously on the same screen. The method may also include the step of updating the a musical note via an electronic document. The musical score and the conductor may be superimposed one over another. Also the musical score may be displayed on one portion of the screen and the conductor image may be displayed on another portion of the screen.

In another aspect of the invention a machine readable storage is provided. The machine readable storage may have stored thereon a computer program having a plurality of code sections executable by a machine for causing the machine to perform the steps of displaying a musical note and displaying a conductor image. The musical note and the a conductor image may be displayed simultaneously on the same screen and the musical note may be updated via an electronic document.

BRIEF DESCRIPTION OF THE DRAWINGS

There are presently shown in the drawings embodiments which are presently preferred, it being understood, however, that the invention is not limited to the precise arrangements and instrumentalities shown.

DETAILED DESCRIPTION

The present invention provides systems, methods, and devices for displaying musical notes to a plurality of musicians. The system, method, and device can allow the musicians to simultaneously view the musical notes to be played and the movements, instructions, and improvisations of the conductor. Thus, the systems, methods, and devices can allow musicians to concentrate their attention solely on creating music.

Figure 1:
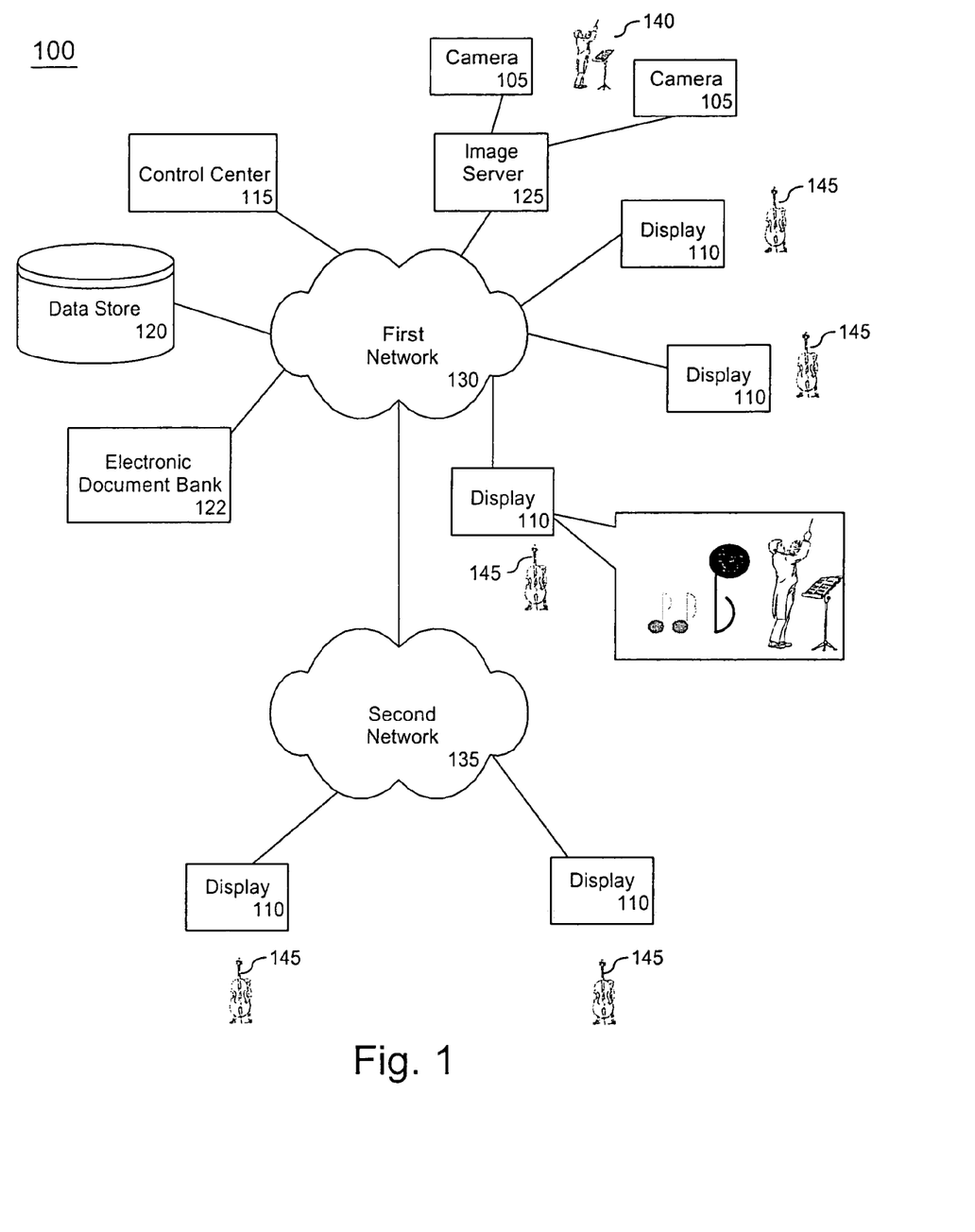
FIG. 1 is a diagram illustrating a musical display system for displaying musical notes to a plurality of musicians in accordance with the inventive arrangements disclosed herein.

FIG. 1 illustrates one embodiment of the musical display system 100 for displaying musical notes to a plurality of musicians 145. The system 100 includes one or more cameras 105, display strictures 110 and one or more control centers 115. The system 100 can also include a data store 120, an image server 125, and an electronic document bank 122.

The first network 130 can communicatively link the various displays 110, image servers 125, cameras 105, control centers 115, data stores 120, and electronic document banks 122, that form system 100. The first network 130 can utilize any communication medium to facilitate information exchange within the system 100 including, but not limited to, line-based pathways and wireless pathways such as cellular protocols, Wi-Fi, Bluetooth, the 802.11 family of communication protocols, and the like. Moreover, the first network 130 can include local area networks, wide area networks, and stand-alone computing devices. For example, the first network 130 can include the Internet, intranets, and other sub-networks. Additionally, the network 130 can include mainframes, personal computers, personal data assistants, cellular telephones, land-based telephones, networked peripherals, and other hardware.

The first network 130 can also be communicably linked to the second network 135 which can facilitate communications to distant components of system 100. For instance, the first network 130 can be considered as a local area network ("LAN") communicably linked to the second network 135 that provides communications over great distances. In one example, the second network 135 can include global networks, such as the Internet.

The control center 115 can include any suitable computing device that can generally interconnect the components of system 100 across the first network 130 and the second network 135. The control centers 115 can include one or more processors for executing programmatic functions of the system. The control center 115 can be programmed with suitable software and logic circuitry for interfacing with the various components of the system 100 and for processing images captured by cameras 105 and electronic documents received over the first network 130 and/or the second network 135. Additionally, the processors of the control center 115 can include an animated conductor generator, or a animated conductor engine, for generating animated conductor images.

The control center 115 can fulfill requests by and provide services to the cameras 105, the image server 125, the displays 110, and the data store 120. Additionally, the control center 115 can be an application server for providing applications to the cameras 105, the image server 125, the displays 110, electronic document bank 122, and the data store 120. The control center 115 can also include a wireless transceiver configured to communicate over any standard radio frequency such as cellular and Wi-Fi, for wireless communication with other devices, components, systems, and networks, that are within and outside of system 100. For instance, the control center 115 can wirelessly communicate with a mobile display 110.

The cameras 105 can capture one more images of conductor 140, which can include both still images and video images of conductor 140. Whether capturing still images and/or video images, the images are preferably captured in a digital format for ease of transmission to other components of system 100. Any suitable digital still image format, such as TIFF ("Tag Image File Format"), JPG (the Joint Photographic Experts Group standard), RAW (raw data format), GIF ("Graphics Interchange Format"), and the like, can be used. Similarly, any suitable digital video format, such as MPEG (Moving Picture Experts Group standards including MPEG-1, MPEG-2, MPEG-3, and MPEG-4), AVI ("Audio Video Interleaved"), RAM ("Real Audio Media"), ASF ("Advanced Streaming Format"), and the like, can be used.

Nevertheless, the cameras 105 are not limited to digital cameras, as analog cameras, i.e. film cameras, are suitable. Thus, the cameras can include digital still image cameras 105, digital video cameras 105, analog still image cameras 105, and analog video cameras 105 and/or combinations thereof. It should be noted that digital cameras 105 can include suitable memory devices, such as flash cards, writable compact disk drives, hard drives, and the like for storing captured images.

In one arrangement, the image server 125 can be provided and can include any suitable computing device that can interconnect the cameras 105 with the components of system 100. The image server 125 can be programmed with suitable software and logic circuitry for interfacing with the cameras 125 and the various components of the system 100. The image server 125 can also provide image capturing instructions to the cameras 105, process the captured images, and fulfill requests for the images by transmitting the images to various components of system 100. Notably, the image server 125 can compress the still images and/or video before transmitting such video and/or still images to the other components of the system 100. Nevertheless, it should be noted that the image server 125 is not necessary as the system 100 can suitably function without the image server 125.

The electronic document bank 122 can provide electronic documents which can include sheet music for presenting musical notes. A non-exhaustive list of electronic documents can include portable document files ("PDF"), hypertext markup language ("HTML"), extensible markup language ("XML"), and the like. Further it should be noted that electronic documents can include portions of a larger document, such as a stream of data that comprises a lager electronic document. The electronic document bank 122 can include any suitable locations, computers, and networks, which can provide electronic documents. For instance, the electronic document bank 122 can include a multitude of websites, file transfer protocol servers, networks, and like, for providing electronic documents.

The data store 120 can include any suitable medium for storing conductor images and electronic documents which contain musical notes and can be presented at displays 110. The data store 120 can store conductor images in any format in which the images are captured. Similarly, the data store 120 can store electronic documents in any suitable format. Thus, the data store 120 can include a hard drive, flash memory, random access memory ("RAM"), read only memory ("ROM"), and the like, for storing conductor images and electronic documents. Additionally, the data store 120 can include multiple, separate data stores for mirroring stored data for retrieval and loss prevention.

The displays 110 can be communicably linked to the components of system 100 and can include any suitable structure configured to display at least one conductor image and one or more musical notes. In one embodiment, the displays 110 can include memory for storing conductor images and musical notes which can be accessed for presentation. Nevertheless, the display 110 is not limited in this regard as the display 110 can be configured with appropriate circuitry and software for receiving and displaying a stream of conductor images and electronic documents having musical notes with are not stored in the memory of the display 110.

The display 110 can present the conductor images and the musical notes simultaneously to provide the musician with a centralized location for viewing both the musical notes and the conductor. A non-exhaustive list of suitable structures include a liquid crystal display, cathode ray tube, plasma screen, and the like. Further, it should be noted that the display 110 can include suitable wireless circuitry for wirelessly communicating with the components of system 100.

For instance, the display 110 can be used by an ambulatory musician, such as a musician in a marching band. In such an arrangement, the display 110 can include suitable structure, such as mounting plates, straps, and the like, for securing the display 110 to the instrument and/or body of the musician 145. This arrangement can allow the musician 145 to be mobile while playing their instrument and view the display 110.

In operation, musicians 145 with instruments can be positioned to view the displays 110. Once ready to perform, the conductor 140 can begin the musical performance by directing a musical composition. The control center 115 can communicate with the image server 125 to provide requests and/or instructions for the cameras 105 to capture conductor images. Alternatively, the control center 115 can communicate directly with the cameras 105 to provide instructions and/or to request a transmission of conductor images. In response, the cameras 105 can capture images of the conductor 140 which can be stored locally or transmitted without storing. The image server 125 can compress the conductor images prior to transmission to the control center 115 or the conductor images can be transmitted uncompressed to the control center 115.

Additionally, it should be noted that each musician 145 can receive a different imaged, and therefore, different view of the conductor 140. In a situation where the conductor 140 is targeting directions to a particular musician 145 and/or group of the musicians, the display 110 can show a frontal image of the conductor 140 on the displays 110 of the appropriate musicians 145, while the other displays 110 can show only a side image of the conductor 140. Alternatively, or in combination with the above, the display 110 can include a separate light source that can signal the musician 145 when instructions are directed for that particular musician. The conductor 140 can use a wand that emits a signal to identify the relevant musicians 145 for displaying the targeted instructions.

The control center 115 can also communicate with the electronic document bank 122 and can request particular electronic documents. The control center 115 can receive the electronic documents and can transmit the electronic documents to a variety of components of system 100, such as the data store 120 for storage and the display 110 for presentation. In the preferred embodiment, the electronic documents can be requested and received from the electronic document bank 122 prior to the director beginning the musical production. Nevertheless, the invention is not limited in this regard as the electronic documents can be requested and received during the musical production. Such an arrangement can be beneficial for impromptu changes in the musical composition.

Once the conductor images and the electronic documents are received by the control center 115, they can both be transmitted from the control center 115 and over the first network 130 to a variety of components of system 100. Nevertheless, the control center 115 can process and manipulate the conductor images and electronic documents as desired before further transmission. For instance, the control center 115 can manipulate the conductor images so that only a portion of conductor image, such as the hand movements, will be displayed as the conductor image. The control center 115 can instruct the data store 120 to store the conductor images and the electronic documents.

Importantly, the conductor images and electronic documents can be transmitted over the first network to displays 110. The display 110 can present the conductor images and electronic documents as received and can also store the conductor images and electronic documents for retrieval and presentation. The display 110 can present the conductor's movements via the conductor images so that the musicians 145 can follow the conductor's 140 instructions. Simultaneously, the display 110 can present the electronic document showing the musical notes corresponding to the musical composition being directed by the conductor 140. In tempo with the pace of the musical composition, the display 110 can alter the presentation of the musical notes to follow the progression of the musical composition. For instance, the musical notes of the electronic document can be scrolled along the screen as the musical composition progresses. Additionally, the musical notes can be highlighted, as shown in FIG. 1, to inform the musician 145 that a particular note is to be played. With the displayed conductor images and electronic documents showing the musical notes, a musician 145 can simultaneously view both the conductor 145 and the musical notes.

Further, the conductor images and electronic documents can also be transmitted over the second network 135 to displays 110. In such an arrangement, geographically distant musicians 145 can contemporaneously receive and be presented with conductor images and musical notes from the electronic documents. Thus, geographically remote musicians 145 can simultaneously perform musical compositions.

It should also be noted that the invention is not limited to the particular arrangement of operation discussed above. For instance, the control center 115 can be configured to simply provide instructions to the different components of system 100 and does not need to receive either the conductor images or the electronic documents. For instance, because the cameras are communicatively linked with the displays 110 over the first network 130 and the second network 135, the cameras 105 can transmit the conductor images directly to the displays 110. Additionally, when an animated conductor generator is used, the cameras 105 may not be necessary; however, the cameras can still enhance the system. Still further, because the electronic document bank 122 is communicatively linked to the displays 110 over the first network 130 and the second network 135, the electronic document bank 122 can transmit the electronic documents directly to the displays 110. Still alternatively, the electronic documents and conductor images can be stored in the data store 120 and can be served directly to the displays 110.

Figure 2A:
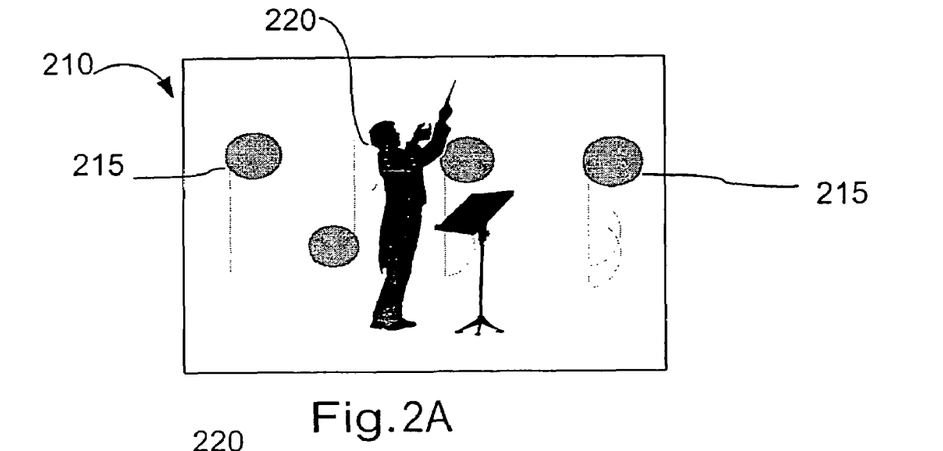
FIG. 2A illustrates one embodiment of the display shown in FIG. 1.
Figure 2B:
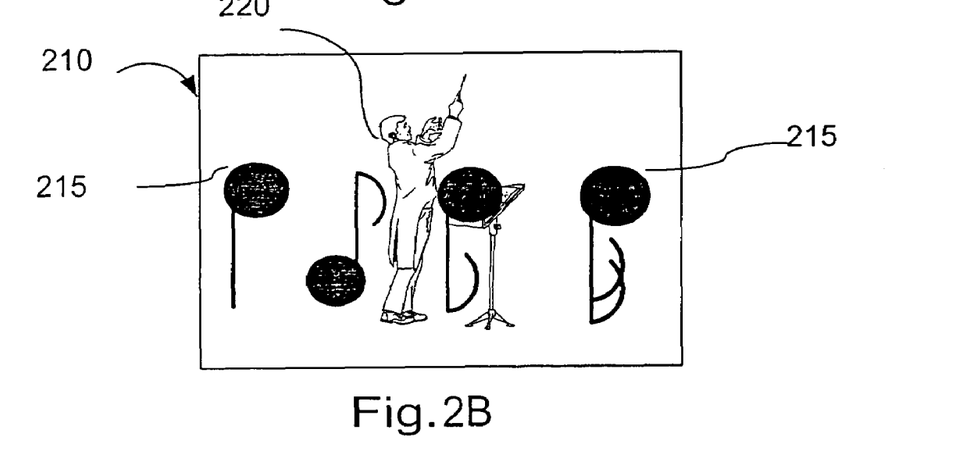
FIG. 2B illustrates another embodiment of the display shown in FIG. 1.
Figure 2C:
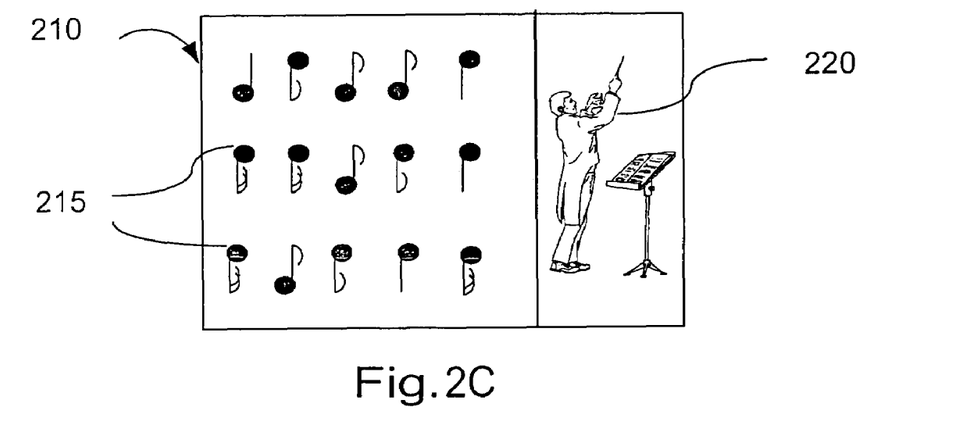
FIG. 2C illustrates yet another embodiment of the display shown in FIG. 1.

In one embodiment shown in FIG. 2A, the display 210 can present the musical notes 215 of the electronic document as superimposed with the conductor images 220. Accordingly, the conductor images 220 can also be superimposed with the musical notes 215 of the electronic document as shown in FIG. 2B. The process of superimposing the musical notes 215 and the conductor images 220 is described in U.S. Pat. No. 6,421,496 B1 to Sato, which is incorporated herein by reference. Nevertheless, it should be noted that the superimposition of the conductor images 220 and the musical notes 215 is not necessary, as they both can be presented on separate portions of the display 210, as shown in FIG. 2C.

Figure 3:
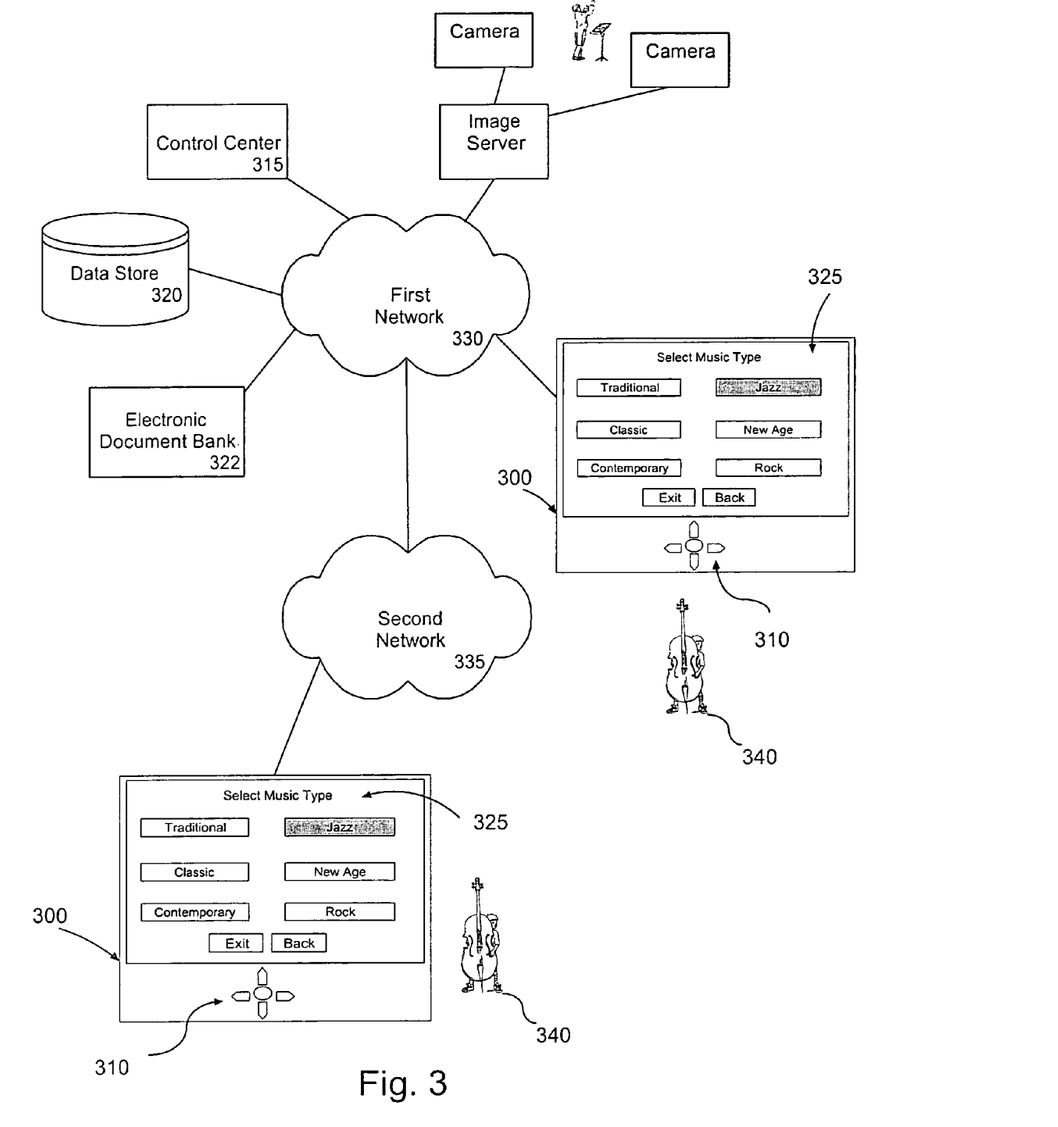
FIG. 3 illustrates one embodiment of the display connected to a musical display system.

In another arrangement shown in FIG. 3, the display 300 can include suitable input structure 310 can provide a user interface 325 for selecting particular music compositions. The input structure 310 can include scroll dials, track pads, a mouse, and navigational buttons for making selections. Further, the display 300 can include suitable touch screen technology for making selections.

In operation, a user of display 300 can use the input structure 310 to navigate the user interface 325. The user can make the appropriate selections to select a desired musical composition. If the musical composition is stored in the memory of the display 300, the display can immediately present the electronic document of the musical composition. Otherwise, the display 300 can communicate over the first network 330 and/or the second network 335 to retrieve the electronic documents from one or more of the control center 315, the data store 320, and the electronic document bank 322. Once the electronic document is received, the display 300 can present the musical notes to the user. Thus, such an embodiment, allows the user to have on demand access to a multitude of musical compositions instead of resorting to voluminous stacks of musical scores written on paper compilations.

Figure 4:
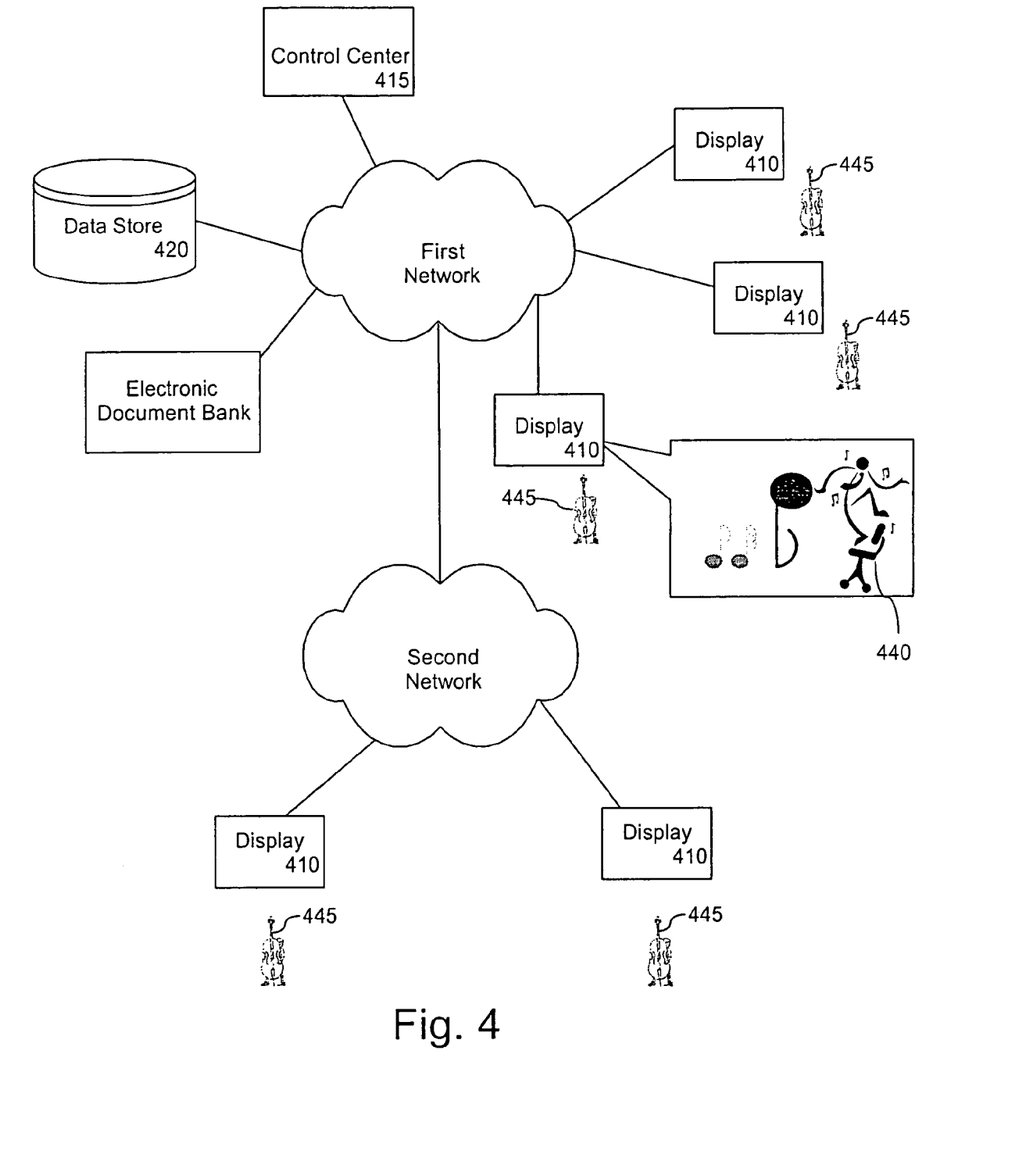
FIG. 4 depicts one embodiment of the present invention showing an animated conductor image in accordance with the inventive arrangements.

In still another arrangement as shown in FIG. 4, the control center 415 can initiate the animated conductor generator to provide the images of a conductor 440. The animated conductor images 440 can be generated using standard animation software, techniques, and engines. The control center 415 can also initiate the animated conductor generator to program the movements of the animated images of the conductor 440 to correspond to a particular musical composition. In such an arrangement, the movements of the animated conductor images can provide instruction to the musicians 445. Further, the animated conductor images 440 can be pre-recorded and stored in the data store 420 for use during musical performances. For instance, the animated conductor images can be presented at displays 410 in lieu of presenting non-computer generated conductor images, such as a video of a human conductor. Similar to the non-computer generated conductor images, the animated conductor images 440 can be superimposed with the musical notes of the electronic document and can also be present on separate portions of the display 410.

The invention also provides a method of providing enhanced musical scores. The steps of method 500 are shown in the flow chart of FIG. 5. Nevertheless, it should be noted that the method 500 can include further steps not shown in FIG. 5. Further, it should be noted that steps of method 500 are not limited to any particular order or sequence and that the practice of method 500 is not limited to practice with any particular devices and/or systems.

Figure 5:
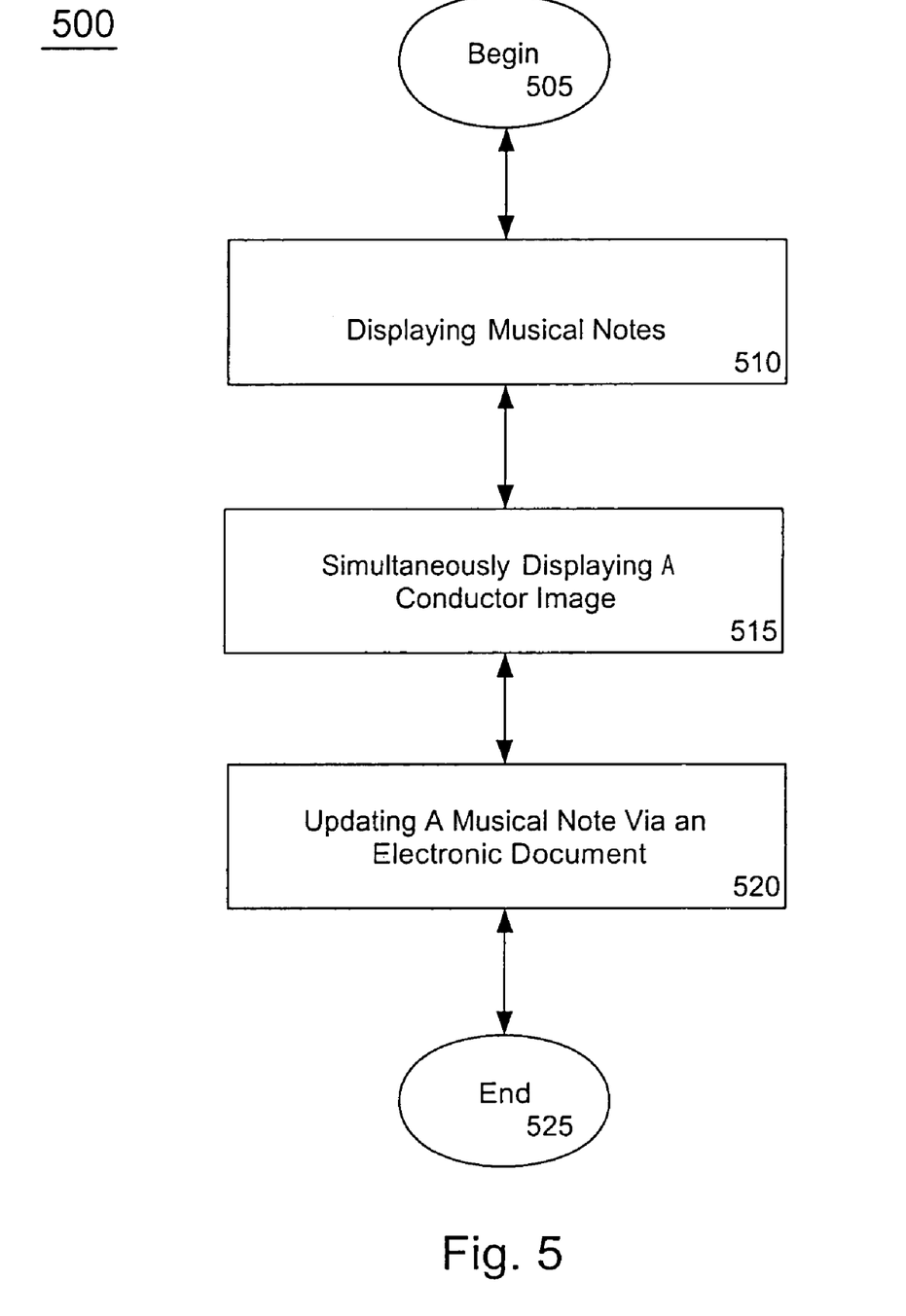
FIG. 5 is a flow chart illustrating a method for providing musical instruction in accordance with the inventive arrangements.

Method 500 can begin at step 505. In step 510, one or more musical notes can be displayed. Displaying the notes includes any form of visually displaying the musical notes to a user. For instance, displaying notes can simply include presenting a graphical image of a musical note on a display screen, such as a liquid crystal display.

In step 515, a conductor image can also be displayed simultaneously with the display of the musical note. Similar to the display of a musical note, displaying a conductor image presents a visual image to a user. It should be noted that although the conductor image and the musical note can be displayed on and/or with the same display device, as the method is not limited in this regard. For instance, the conductor image and the musical note can be displayed simultaneously on separate display structures. Nevertheless, the conductor image and the musical note can also be displayed simultaneously on the same display device by either displaying each in separate portions of the display or by superimposing the conductor images and the musical notes upon each other.

In step 520, the musical note can be updated via an electronic document. Updating the musical note can include downloading and/or receiving a transmission of musical notes to present the progression of notes as the composition progresses. Further, it should be noted that updating the musical note can include either receiving notes from the same musical composition as received previously, or can include receiving notes from a different musical composition than that received previously. The method 500 can end at step 525 or any of the previous steps can be practiced again.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: conversion to another language, code or notation; and reproduction in a different material form.

Although the present invention has been described in conjunction with the embodiments disclosed herein, it should be understood that the foregoing description is intended to illustrate and not limit the scope of the invention as defined by the claims.

What is claimed is:

1. A musical display system for displaying musical notes to a musician, comprising:
   at least one camera for capturing at least one conductor image;
   at least one display structure configured to display at least one conductor image and at least one musical note;
   at least one processor coupled to said at least one camera and said at least one display structure;
   wherein said processor signals said camera to capture at least one conductor image; and
   wherein said processor signals said display structure to display at least one conductor image and at least one musical note; and
   wherein the conductor image is superimposed with the at least one musical note.

2. A system according to claim 1, wherein the conductor image is superimposed with the at least one musical note.

3. A system according to claim 1, wherein the display structure displays an advancing musical score.

4. A system according to claim 1, wherein said camera includes a video camera for capturing video of the conductor images.

5. A system according to claim 1, wherein said processor is configured to receive electronic documents, wherein said electronic documents contain images of the musical note.

6. A system according to claim 1, wherein said display structure further includes a user interface for providing the user the ability to navigate through a plurality of music compositions and select at least one musical composition.

7. A system according to claim 1, wherein said processor is configured to receive electronic documents, wherein said electronic documents contain images of the musical note.

8. A system according to claim 1, wherein said display structure further includes a user interface for providing the user the ability to navigate through a plurality of music compositions and select at least one musical composition.

9. A musical display system for displaying musical notes to a musician, comprising:
   at least one display structure configured to display at least one conductor image and at least one musical note;
   at least one processor coupled to said at least one display structure, said processor including a animated conductor generator;
   wherein said processor signals said display structure to display at least one conductor image and at least one musical note; and
   wherein the conductor image is superimposed with the at least one musical note.

10. A system according to claim 9, wherein said animated conductor is displayed on said display structure as said conductor image.

11. A system according to claim 9, wherein said animated conductor is superimposed with the at least one musical note.

12. A system according to claim 9, wherein movements of said animated conductor providing instruction to the user regarding which notes to play.

13. A system according to claim 9, wherein the display structure displays an advancing musical score.

14. A system according to claim 12, wherein said at least one musical note signals to a user to play said at least one musical note.

15. A system according to claim 12, wherein said at least one musical note signals to a user to play said at least one musical note.

16. A method of providing musical instruction, comprising the steps of:
   displaying at least one musical note;
   displaying at least one conductor image;
   wherein the at least one musical note and the at least one conductor image are displayed simultaneously on the same screen; and
   wherein the conductor image is superimposed with the at least one musical note.

17. The method of claim 16, further comprising the step of updating the at least one musical note via an electronic document.

18. The method of claim 16, wherein the musical score and the conductor are superimposed one over another.

19. The method of claim 16, wherein the musical score is displayed on one portion of the screen and the conductor image is on another portion of the screen.

20. A machine readable storage, having stored thereon a computer program having a plurality of code sections executable by a machine for causing the machine to perform the steps of:

displaying at least one musical note;

displaying at least one conductor image, wherein the at least one musical note and the at least one conductor image are displayed simultaneously on the same screen; and updating the at least one musical note via an electronic document; and wherein the conductor image is superimposed with the at least one musical note.

* * * * *